(No Model.) 6 Sheets—Sheet 2.
H. H. CUMMINGS.
RIVET SETTING MACHINE.
No. 498,423. Patented May 30, 1893.
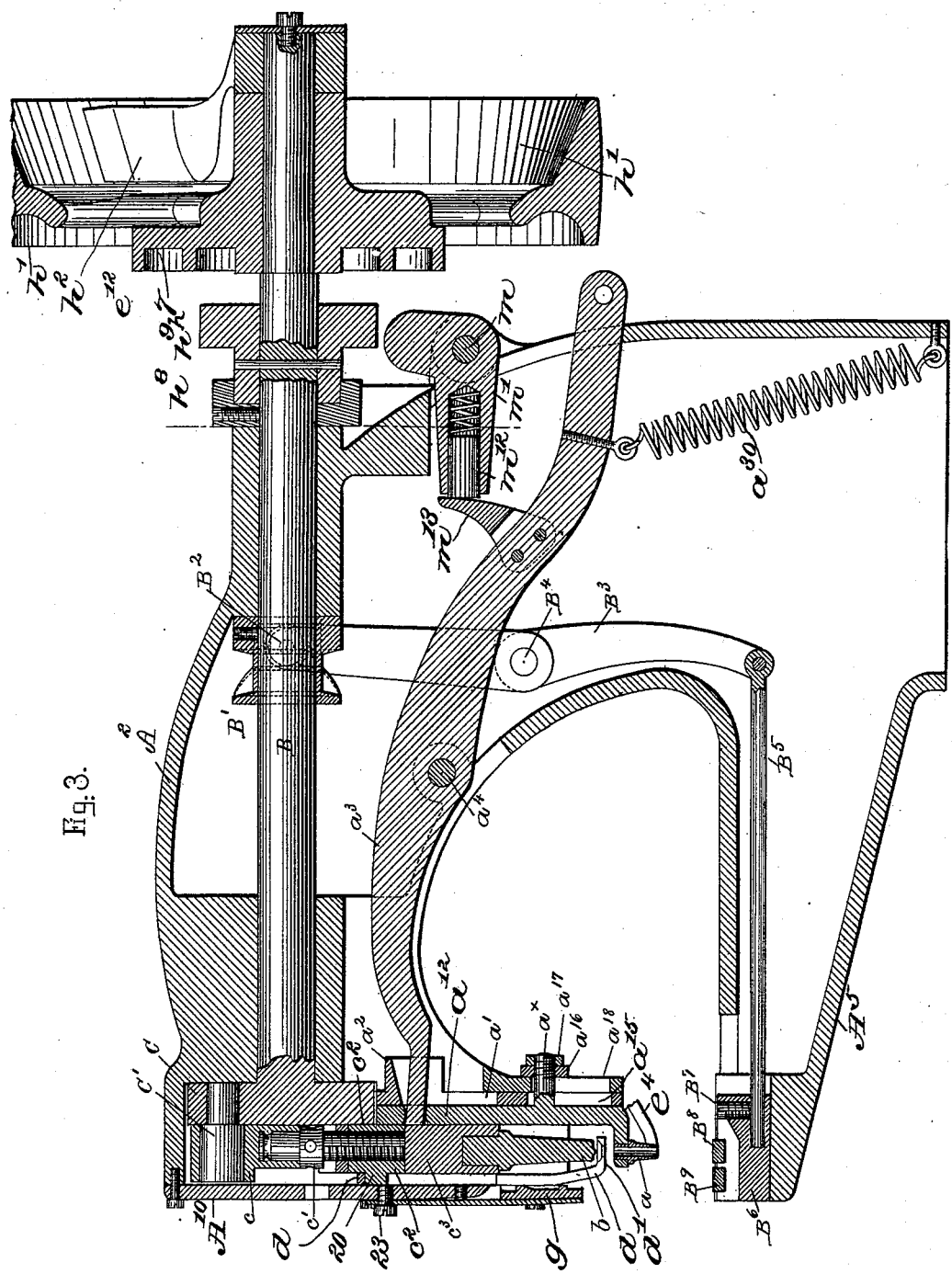
Witnesses.
Louis N. Grovell
Fred S. Greenleaf.
Inventor.
Henry H. Cummings.
by Crosby & Gregory
attys.

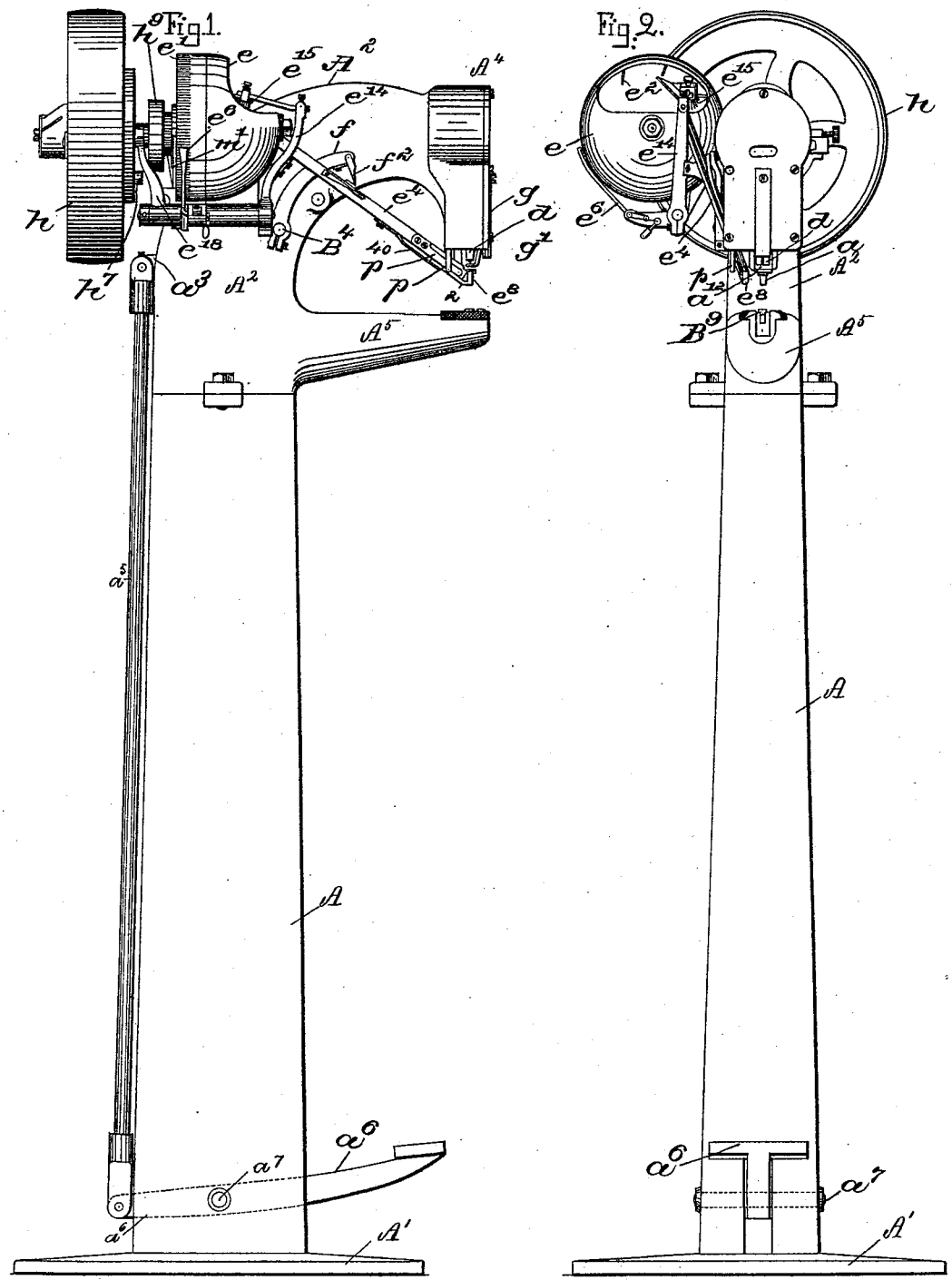

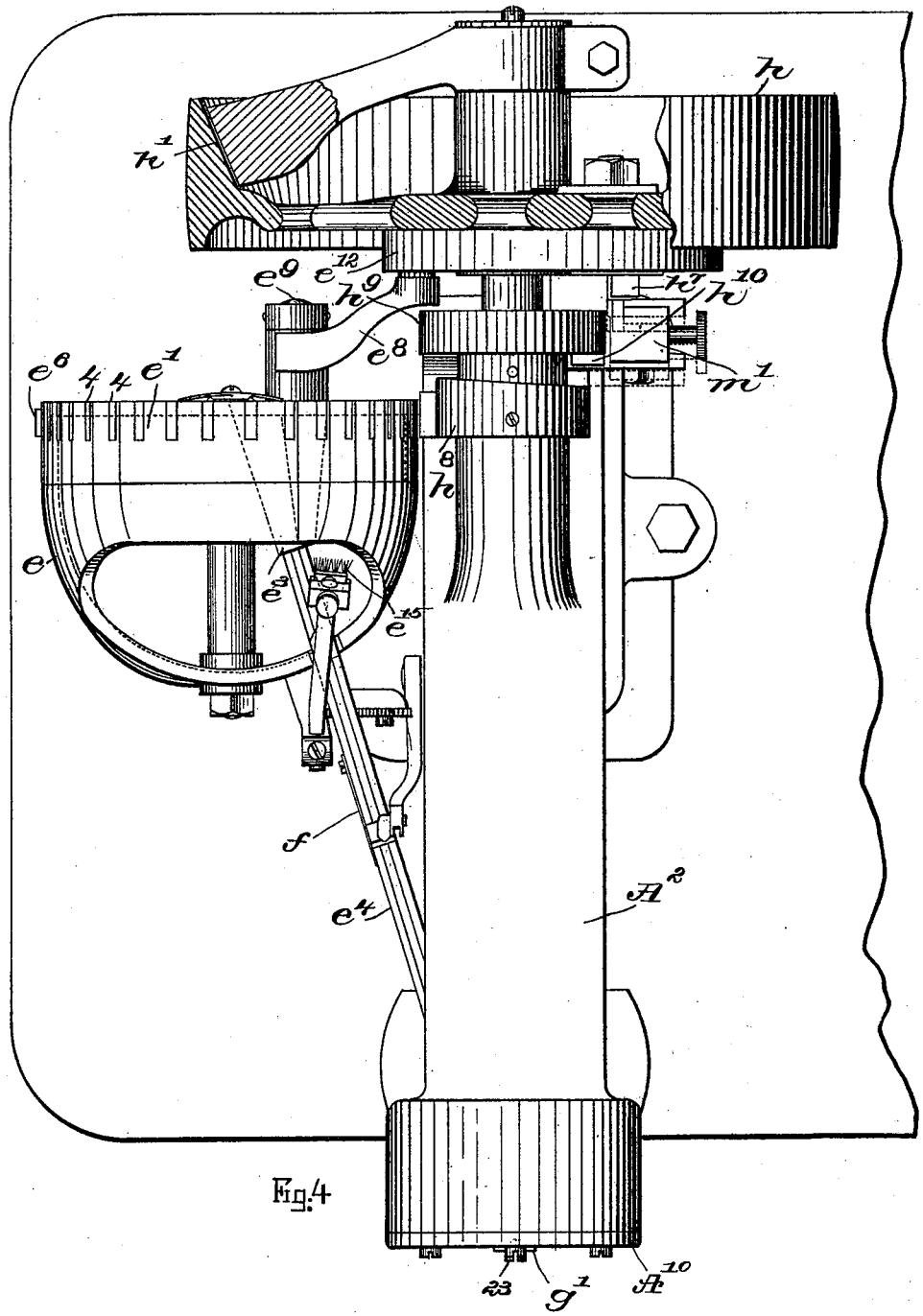

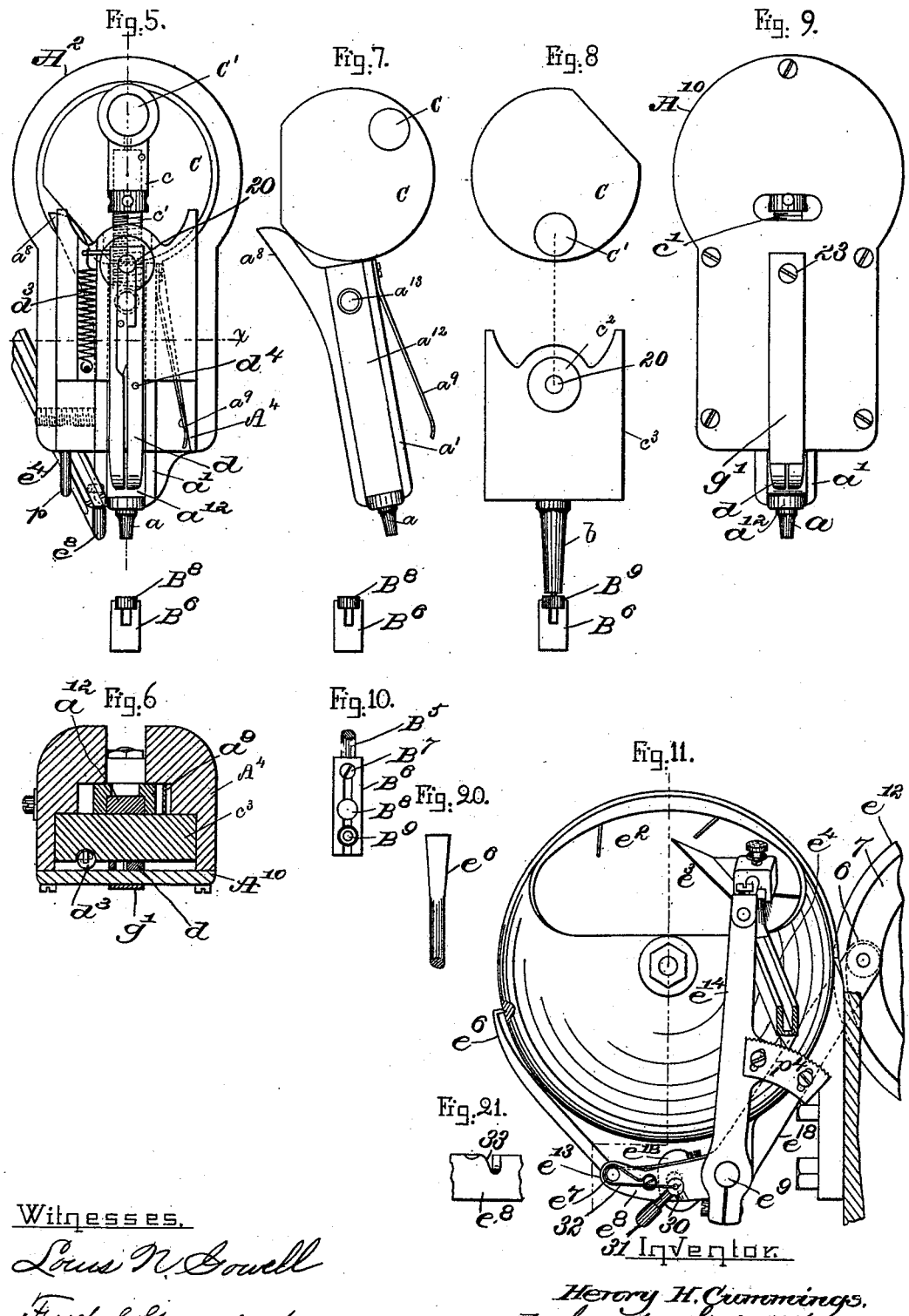

(No Model.) 6 Sheets—Sheet 5.
H. H. CUMMINGS.
RIVET SETTING MACHINE.
No. 498,423. Patented May 30, 1893.
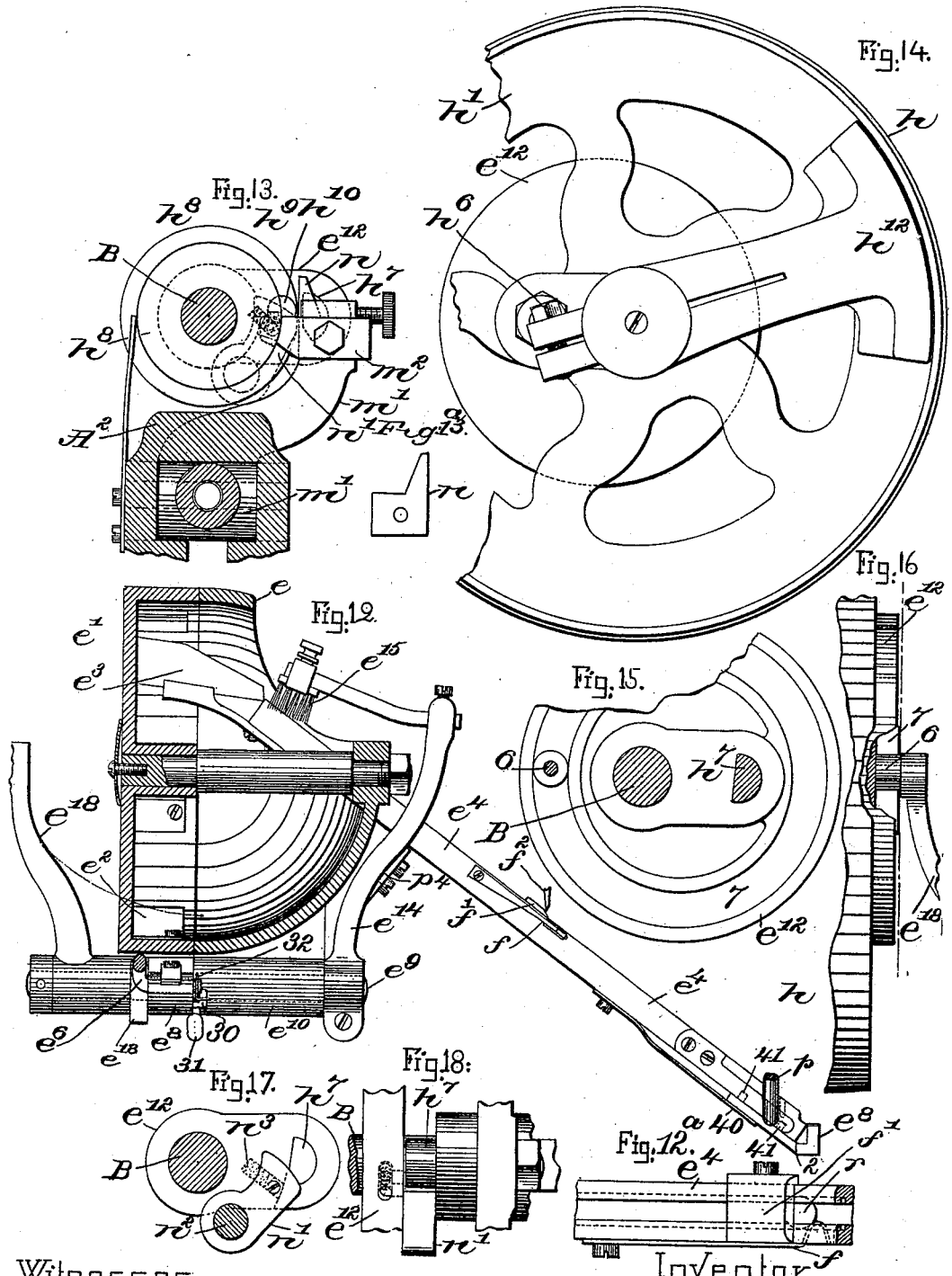
Witnesses.
Louis N. Gowell
Fred S. Greenleaf
Inventor.
Henry H. Cummings.
by Crosby & Gregory
Attys.

(No Model.) 6 Sheets—Sheet 6.
H. H. CUMMINGS.
RIVET SETTING MACHINE.
No. 498,423. Patented May 30, 1893.
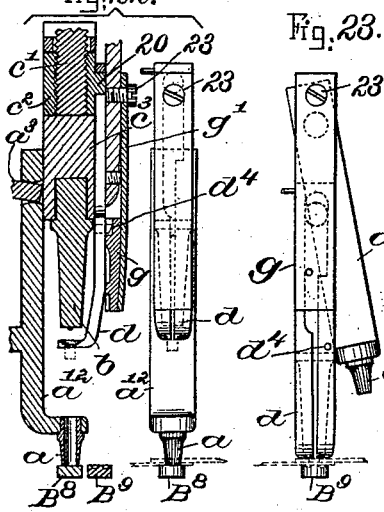
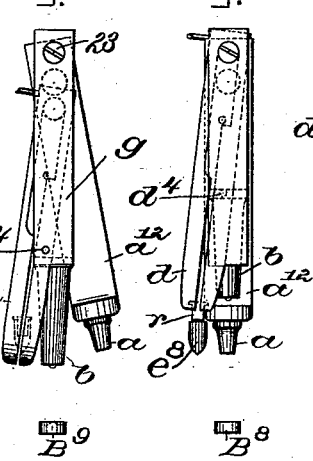
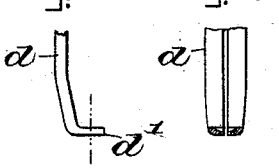
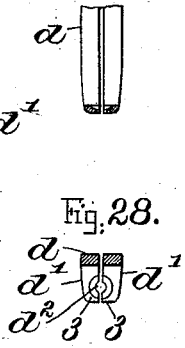
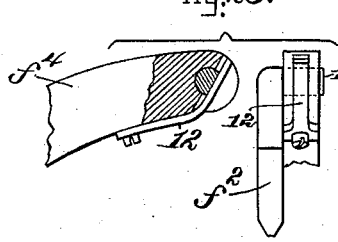
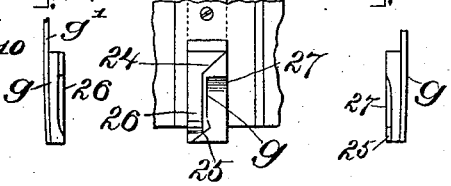
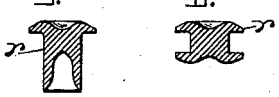
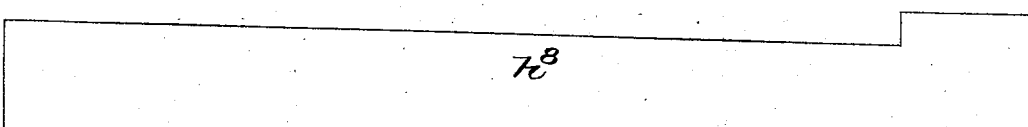
Witnesses.
Louis N. Gowell
Fred S. Greenleaf
Inventor
Henry H. Cummings,
by Crosby & Gregory
attys.

UNITED STATES PATENT OFFICE.

HENRY H. CUMMINGS, OF MALDEN, MASSACHUSETTS, ASSIGNOR TO THE REVERSIBLE RIVET COMPANY, OF PORTLAND, MAINE.

RIVET-SETTING MACHINE.

SPECIFICATION forming part of Letters Patent No. 498,423, dated May 30, 1893.

Application filed July 14, 1892. Serial No. 439,972. (No model.)

*To all whom it may concern:*

Be it known that I, HENRY H. CUMMINGS, of Malden, county of Middlesex, State of Massachusetts, have invented an Improvement in Rivet-Setting Machines, of which the following description, in connection with the accompanying drawings, is a specification, like letters and figures on the drawings representing like parts.

This invention has for its object the production of a machine by which to automatically set headed rivets into leather and other material. The rivets to be set will preferably be put into a hopper in bulk and deposited thereby in a roadway by which they will be led into position to be taken singly from the roadway by a carrier, preferably forked and moved in such manner as to pass the end of the roadway, engage the endmost headed rivet, and carry it from the roadway into position to be struck by the driver, or top-set, the latter as it strikes the rivet driving it from the carrier into the material and into a hole preferably previously made in the material, the top-set forcing the open end of the tubular body of the rivet against a bottom-set, which, entering the rivet shank expands and overturns the rivet as the top-set drives it home. The punch to punch holes in the material for the reception of the rivet is represented as actuated by a treadle under the control of the foot of the operator, and I have combined with this actuating mechanism a clutch-controlling device, whereby, as the punch rises from the material, the clutch pulley for starting in motion the main or cam shaft of the machine is permitted to come into engagement and rotate said shaft once, and be then thrown out of engagement, one rotation of said shaft effecting the driving of a rivet and the taking of a rivet from the roadway to be driven at the next rotation of the said shaft.

One part of this invention consists in the combination in a rivet setting machine, of a punch block; a punch, independent devices actuated manually to depress the punch; a clutch; a shaft controlled as to its rotation by said clutch, a top-set actuated by said shaft, and controlling devices between the actuating device for the punch and the said clutch to enable the clutch to rotate the shaft and actuate the top-set after the punch has done its work, substantially as will be described.

Also in a rivet setting machine containing the following instrumentalities, viz:—a roadway for rivets, a pocket at the end of the roadway for a rivet, a carrier composed of claw-like jaws adapted to embrace the shank of the rivet below its head and lift it from the pocket, a bottom-set, a top-set, and devices to actuate the carrier and cause it to take a rivet positively from the pocket and put it in position under the top-set, substantially as will be described. Also in a rivet setting machine, a roadway, a spring stop, a bridge fast upon and crossing the roadway near and above the spring stop, a pocket at the lower end of the roadway, a pusher and means to actuate it to engage the head of a rivet beyond the bridge and push it past the spring stop, substantially as will be described.

Other features of invention will be hereinafter described and fully set forth in the claims at the ends of this specification.

Figure 1, in side elevation represents a rivet-setting machine embodying my invention; Fig. 2, a front elevation thereof; Fig. 3, an enlarged longitudinal vertical section of the head of the machine, with the punch elevated. Fig. 4, is an enlarged top or plan view of the head of the machine, the upper side of the clutch pulley being broken out; Fig. 5, a front elevation on a scale between that of Figs. 1 and 3, it showing the front of the head with the parts in the position Fig. 2, but with the face or cap plate removed, said figure also showing the cutting block co-operating with the punch; Fig. 6, a section in the line *x*, Fig. 5; Fig. 7, a detail showing the punch guide and its actuating devices, and the cutting block. Fig. 8, shows the top-set, its slide, actuating crank, and the bottom-set. Fig. 9, is an enlarged front elevation of the head of the machine. Fig. 10, is a plan view of the slide carrying the cutting block and the bottom set. Fig. 11, is a detail showing the hopper and some of its actuating devices from the front of the hopper. Fig. 12, is a sectional detail showing the hopper and roadway. Fig. 12$^a$, is a partial top or plan view of the roadway enlarged, with a rivet held by the spring stop. Fig. 13 is a detail of the clutch mechanism. Fig. 13ª, shows the dog releasing device detached. Figs. 14, 15 and 16, show parts of the clutch pulley. Figs. 17, 18 and 19, show yet further details of the clutch mechanism represented in Fig. 13. Fig. 20, is a detail showing the upper end of the pawl $e^6$. Fig. 21, is a detail showing a part of the lever $e^8$; Figs. 22 to 25 inclusive, details showing different positions of the punch, top-set, and carrier, as they will appear in the operation of the machine. Figs. 26 to 28 inclusive, show portions of the rivet carrier in different positions; Fig. 29, details of the pusher to push the rivets singly from the spring stop in the roadway; Figs. 30, 31 and 32 details of the device for swinging the rivet carrier laterally. Fig. 33, shows a rivet in section before it is set. Fig. 34, shows the rivet set, and Fig. 35 shows the cam developed.

The frame-work shown consists essentially of a column A having a base A', the column supporting a head $A^2$ having suitable bearings for the working parts to be described, and a horn or support $A^5$ for the leather or other material, and for the slide $B^6$ supporting the cutting block $B^8$ and the bottom-set $B^9$. The cutting block $B^8$ preferably made of brass or other metal such as commonly used for punches to cut against, has a plain surface. The bottom-set, as shown in the sectional views Fig. 3, has a central point or teat and a surrounding annular groove having a concaved bottom, the teat entering the hollow point end of the shank of the rivet $r$, the concaved groove and teat co-operating, as the rivet is driven home, to flange the hollow shank outwardly and backwardly as represented in Fig. 34.

The main or cam shaft B has a cam B' which receives a roller or other stud $B^2$ at the upper end of a lever $B^3$ pivoted at $B^4$ and connected by link $B^5$ with the slide $B^6$ through a suitable screw $B^7$. The shaft B at its front end has a cam shaped crank C provided with a crank pin C' which enters an eye at the upper end of an adjustable link $c$, $c'$, the part $c$ receiving or having swiveled in it loosely the upper or head end of the part $c'$ of the link made as a screw, see Figs. 3, 5 and 22, said screw being screwed into a loose and preferably cylindrical block $c^2$ carried by the top-set slide $c^3$ fitted into ways in the front of the head $A^2$, said slide carrying the top-set $b$, the lower end of which is shaped substantially as the head of the rivet and preferably so as to leave the head of the rivet with a concavity. The loose block $c^2$ has a stud 20, over which is fitted the slotted upper end of the jaw-like rivet carrier $d$, the shape of which is shown best in Fig. 5, the said carrier consisting essentially of a pair of spring arms bent at their lower ends to form each a part of a claw $d'$, see Figs. 27 and 28, having a seat $d^2$ for the head of the rivet $r$, as will be described. The carrier derives its reciprocating movements from the stud 20 attached to the slide $c^3$, the slot in the carrier in which the stud 20 enters permitting lost motion between the carrier and the slide, as will be described, the carrier being normally held down by spring $d^3$ with the upper end of the said slot on the stud 20. The carrier $d$ at its outer side has a pin $d^4$, see Figs. 5, 22, 23 and 25, which co-operates with a cam switch $g$ mounted on a spring arm $g'$ shown in Fig. 9, connected to the face plate $A^{10}$ by a screw 23. This cam switch has acting inclined projections 24 and 25, and concaved faces 26 and 27. The projection $d^4$ of the carrier passes along the cam surface or shoulder 24 and travels thence down over the concaved face 26 during the descent of the slide $c^3$, the spring $d^3$ causing the descent of the carrier at such time, and the carrier having completed its down stroke passes off the high lower end of the concave surface 26 to a point below the inclined shoulder 25. After this as the slide $c^3$ is being lifted the stud 20 acting on the upper end of the slot in the carrier causes the latter to be lifted, and at such time the projection $d^4$ thereof acts against the incline 25 and effects the lateral swinging of the lower end of the carrier toward and into a position next the end of the roadway, and as the upward movement of the carrier is continued, the wedge-shaped end of the roadway acting on the claws of the carrier spread the said jaws apart so that they ride up embracing the end of the roadway and finally contact with the under side of the head of the rivet and pick the said rivet out of the roadway. The carrier having lifted the rivet from the roadway, the projection $d^4$ passes the high end of the concavity 27, and immediately thereafter the spring $d^3$ acts to throw the carrier into substantially vertical position, its normal position, see Figs. 22, with the rivet held by it in the line of travel of the top-set.

Arranged behind the slide $c^3$, see Figs. 3, 6 and 7, is a swinging, laterally-movable punch-bar guide $a'$ having a hollow slotted hub or pivot $a^2$ fitted to turn in a suitable hole made for it in the head $A^2$, said guide having an arm $a^8$ which is acted upon once during each rotation of the cam shaft crank or device C, so that the said guide is vibrated back and forth about the stud $a^2$ as a fulcrum. The guide receives and guides the punch bar $a^{12}$ having an attached punch $a$.

The punch-bar $a^{12}$ has a hole $a^{13}$ see Fig. 7 which receives one end of a lever $a^3$ pivoted at $a^4$ and acted upon by a spring $a^{30}$ to normally keep the front end of the lever $a^3$ up and the punch elevated. The punch bar may be depressed to cause the punch $a$, to enter the material, or to remove the punch from the position Figs. 1 to 3, into the position Fig. 22, by the operator putting his foot on the treadle $a^6$ pivoted at $a^7$, and connected by rod $a^5$ with the outer end of said lever $a^3$, thus lifting said end. The punch bar has a screw stud $a^x$ extended loosely through a slot $a^{15}$ in the guide $a'$, and then through a slot $a^{18}$ in the head, and through a friction device or washer $a^{16}$, after which said screw is provided with a nut $a^{17}$.

The rivets in bulk are put into the hopper composed, as shown, of a stationary pot or hemispherical shell $e$, and a rotating wheel $e'$ having a series of shelves $e^2$ to lift the rivets and drop them onto the inclined table $e^3$ at the upper end of the roadway $e^4$ slotted to guide the shank of the rivet $r$ down to the end of the roadway, at which point I have located a spreader $e^5$ having a pocket for the reception of each rivet in succession as it is pushed past the spring stop, to be described. This spreader, preferably held loosely to the roadway by a spring 40 is rounded or tapered, or made of wedge-shape, see Fig. 25, it receiving a rivet, yet leaving the head thereof so exposed that the carrier may in its elevation next the end of the spreader and roadway, catch under the head of the rivet and remove it from the pocket, as best shown in Figs. 24, 25 and 22, by dotted lines.

Fig. 24, shows the carrier as below the tapered end of the spreader and about to be lifted to engage the under side of the head of the rivet.

The hopper part $e'$, as shown best in Fig. 4, is provided with a series of notches 4 which are engaged by a pawl $e^6$.

The pawl $e^6$ is mounted on an arm $e^8$ fast on a rock shaft $e^9$ mounted in the bearing $e^{10}$. Loose on this rock shaft is a lever $e^{18}$ having a roller or other stud 6 which enters the groove 7 in the continuously rotating belt pulley $e^{12}$ forming one member of the clutch pulley.

The arm $e^8$ has a locking device 30, shown as a sliding and rocking pin, provided with a handle 31 and acted upon by a spring 32, said pin co-operating with the cam surface 33, see Fig. 21, of the arm $e^8$, the cam acting to draw the pin out. When the locking device is in and engages the lever $e^{18}$, the latter lever causes the arm $e^8$ and rock shaft $e^9$ to be moved, but when it is desired to stop the rotation of the hopper, the locking device will be disengaged from the lever $e^{18}$. The rock shaft $e^9$ has clamped or secured to it an arm $e^{14}$ carrying a suitable brush or clearer $e^{15}$ which is made to traverse the top of the roadway just below the table $e^3$ and sweep off any rivets, the shanks of which are not properly within the groove of the roadway.

I have provided the side of the roadway, see Figs. 4, 12 and 12ª, with a detent $f$ which serves as a spring stop for the leading rivet in the roadway above the stop. The roadway has fast upon it just above the stop a bridge $f'$ on which bears normally a pusher $f^2$, the shank 10 of which is slabbed or flattened as in Fig. 29, and acted upon by a spring 12 secured to an arm $f^4$ clamped on one end of the rock shaft $B^4$, before described, said rock shaft as it is turned in one direction causing the pusher to slide down off the beveled lower end of the bridge and strike the head of a rivet partially or wholly exposed or uncovered below the bridge, see Fig. 12ª, said pusher acting to push the rivet so engaged beyond the spring stop and then retiring from it, the rivet sliding by gravity to the lower end of the roadway and into the pocket of the spreader. Preferably the head of the rivet will be provided with a concavity, as shown in Fig. 33, to aid in feeding the rivet positively past the spring stop.

The pulley $h$ loose on the shaft B and rotated continuously by a belt from a suitable counter shaft, has at its outer face a concavity $h'$ which receives a weighted arm frictionally attached to the said shaft by a clamping screw $h^6$. The weighted arm $h^2$ is so mounted on the shaft B that when the shaft is started suddenly as with a positive clutch, as herein shown, the arm will slip on the shaft, thus avoiding shock, and when the shaft is stopped positively this arm will slip due to its momentum and in doing so will prevent the shaft from rebounding after it has been arrested. The pulley at its inner face has one or more projections $h^7$.

The shaft B has fast upon it a clutch collar $h^8$, shown developed in Fig. 35, said collar being arranged on the shaft B at one side of the collar $h^9$ provided with a stop pin $h^{10}$, a groove or space being left between the two collars.

The head $A^2$ has a pivot $m$ on which is mounted a lever $m'$, shown best in Fig. 13, and provided at one end with a stop finger $m^2$, adapted, when the lever is in one position, or while the punch is being moved, to act against the stop $h^{10}$ and prevent rotation of the shaft B. The lever $m'$ also carries a dog locking device $n$, shown separately in Fig. 13ª, which, when the lever is in position to enable the finger to engage the stop $h^{10}$ serves to hold in a dog $n'$ pivoted at $n^2$ on the collar $h^9$, the actuating spring $n^3$ of the dog being compressed. This dog when released is thrown out so as to be engaged by the projection $h^7$ of the pulley $e^{12}$, such engagement enabling the pulley to start the shaft B. The lever $m'$ has at its inner end a spring-controlled foot $m^{12}$, which, as the inner end of the lever $a^3$ is raised to depress the punch, is struck by a projection $m^{13}$ of the said lever, and the lever $m'$ is subjected to a strain which tends to hold the finger $m^2$ firmly against the stop pin, and the dog-locking device $n$ opposite the dog $n'$, but as soon as the spring $a^{30}$ assumes control of the lever $a^3$ to depress its inner end and lift the punch, said projection $m^{13}$ by rubbing down over the end of the foot $m^{12}$, causes the lever $m'$ to be turned sufficiently to cause the finger $m^2$ to leave the stop pin $h^{10}$ and move the dog locking device away from the dog, letting it fly out, as described. The shaft will be rotated once, and in its rotation the cam face of the collar $h^8$ acting on the side of the finger $m^2$ will cause the lever $m'$ to be turned slightly and the said finger to be put into position to be struck by the stop pin $h^{10}$, and the locking dog in position to be struck by the dog $n^2$, to thus release the latter from the projection $h^7$.

To properly support the lower end of the roadway, I have provided the head of the machine with a stud or projection to enter a groove or recess at one side of the roadway near its end, and the roadway is kept seated on the stud by the action of a finger $p$ depending from the head, see Figs. 1, 2 and 12, on a rather stiff spring $p'$ connected at one end to the roadway. The arm $e^{14}$ has attached to it an agitator $p^4$ made as a toothed plate, see Fig. 11, which by acting on the under side of the roadway shakes the same sufficiently to insure the movement of the rivets down the roadway.

Having described my invention, what I claim, and desire to secure by Letters Patent, is—

1. In a rivet setting machine, a punch block; a punch, controlling devices actuated manually to depress the punch; a clutch; a shaft controlled as to its rotation by said clutch, a top-set actuated by said shaft, and devices between the actuating device for the punch and the said clutch to enable the clutch to rotate the shaft and actuate the top-set after the punch has done its work, substantially as described.

2. A rivet setting machine containing the following instrumentalities, viz;—a roadway for rivets, a pocket at the end of the roadway for a rivet, a carrier composed of claw-like jaws adapted to embrace the shank of the rivet below its head and lift it from the pocket, a bottom-set, a top-set, and devices to actuate the carrier and cause it to take a rivet positively from the pocket and put it in position under the top-set, substantially as described.

3. In a rivet setting machine, a roadway, a spring stop, a bridge fast upon and crossing the roadway near and above the spring stop, a pocket at the lower end of the roadway, a pusher and means to actuate it to engage the head of a rivet beyond the bridge and push it past the spring stop, substantially as described.

4. In a rivet setting machine, the roadway, the hopper to deposit rivets in the roadway, the lever $e^{18}$, means to actuate it during the rotation of the driving pulley of the machine, a pawl-carrying arm, a pawl thereon to rotate the hopper, and a locking device substantially as described to effect the release of the arm and lever when it is desired to leave the hopper at rest, substantially as described.

5. In a rivet setting machine the cutting bed; the punch, and the punch-bar, combined with the pivoted punch-bar-guide, devices including a cam surface to swing the said guide laterally, and devices under the control of a treadle or equivalent for depressing the punch-bar, substantially as described.

6. In a rivet setting machine the bottom-set, the shaft B, its crank pin, the top-set slide, and the top-set and swivel block, combined with a connecting rod entering said swivel block, substantially as described.

7. In a rivet setting machine the bottom-set, the shaft B, its crank pin, the top-set slide, and the top-set and swivel block having a stud, combined with an adjustable two-part connecting rod entering said swivel block, a rivet carrier having spring jaws and a roadway, substantially as described.

8. In a rivet setting machine, a roadway having a pocket to receive a rivet, a rivet carrier composed of jaws provided with claws, and a projection $d^4$, combined with a spring-supported cam switch adapted to co-operate with said projection to swing the carrier laterally, and devices to reciprocate the carrier, substantially as described.

9. In a rivet setting machine, the shaft B having fast upon it the cam collar $h^8$ having a pivoted dog, and collar $h^9$ provided with a stud located in the groove between said collars, the lever provided with the stop finger and dog locking device, combined with a pulley normally loose on said shaft and provided with a stop $h^7$, and devices to turn said lever to cause the stop finger to release the collar and the dog locking device to release the dog, substantially as described.

10. In a rivet setting machine the shaft B, its attached cam collar $h^8$, and collar $h^9$ provided with a stop pin and dog, combined with a lever provided with a finger and a dog locking device, said lever when moved to effect the release of the dog and stop pin enabling the shaft to be rotated by the rotating pulley the cam collar during the first rotation of the said shaft acting on the said finger to turn the lever in the direction to cause the dog locking device to effect the release of the dog from the loose pulley and stop the rotation of said shaft, substantially as described.

11. In a rivet setting machine the shaft B, its frictionally attached weighted arm, normally rotating therewith combined with the loose pulley, and a clutch device co-operating therewith to operate, substantially as described.

In testimony whereof I have signed my name to this specification in the presence of two subscribing witnesses.

HENRY H. CUMMINGS.

Witnesses:
G. W. GREGORY,
M. J. SHERIDAN.